(12) United States Patent
Yun et al.

(10) Patent No.: US 11,639,784 B2
(45) Date of Patent: May 2, 2023

(54) LIGHTING DEVICE, LIGHTING ATTACHMENT DEVICE, AND METHOD FOR MANUFACTURING LIGHTING COVER

(71) Applicant: SHERPA SPACE INC., Daejeon (KR)

(72) Inventors: Choa Mun Yun, Daejeon (KR); Wonjoon Choi, Daejeon (KR)

( * ) Notice: Subject to any disclaimer, the term of this patent is extended or adjusted under 35 U.S.C. 154(b) by 31 days.

(21) Appl. No.: 17/106,396

(22) Filed: Nov. 30, 2020

(65) Prior Publication Data
US 2021/0270446 A1    Sep. 2, 2021

(30) Foreign Application Priority Data

Feb. 27, 2020 (KR) .................. 10-2020-0023981

(51) Int. Cl.
*A01G 7/04* (2006.01)
*F21V 14/08* (2006.01)
*F21V 3/00* (2015.01)

(52) U.S. Cl.
CPC .............. *F21V 14/08* (2013.01); *A01G 7/045* (2013.01); *F21V 3/00* (2013.01)

(58) Field of Classification Search
CPC ........ A01G 7/045; A01G 9/249; F21V 17/002
See application file for complete search history.

(56) References Cited

U.S. PATENT DOCUMENTS

| 2011/0115385 A1* | 5/2011 | Waumans | A01G 7/045 |
| | | | 315/152 |
| 2011/0317099 A1* | 12/2011 | Fuchida | G02B 5/3033 |
| | | | 349/64 |
| 2013/0188389 A1* | 7/2013 | Overturf | A01G 9/249 |
| | | | 362/583 |
| 2019/0082611 A1* | 3/2019 | Speer | A01G 7/045 |

FOREIGN PATENT DOCUMENTS

| KR | 101468141 B1 | 12/2014 |
| KR | 1020200000398 A | 1/2020 |
| KR | 1020200004962 A | 1/2020 |

* cited by examiner

*Primary Examiner* — William J Carter
(74) *Attorney, Agent, or Firm* — Harvest IP Law, LLP

(57) ABSTRACT

A lighting device, a lighting attachment device, and a method of manufacturing a lighting cover having a film coated with an optical-scattering agent are provided. The lighting device includes: a lighting unit having a lighting cover, the lighting cover having an adjustable degree of optical scattering; and a control unit configured to adjust the lighting cover to an appropriate degree of optical scattering according to the growth state of a cultivation subject. The method for manufacturing a lighting cover includes: partitioning a lighting cover of a synthetic resin material into a plurality of scattering zones; and coating an optical-scattering agent on the lighting cover such that each of the scattering zones has a different degree of optical scattering.

11 Claims, 10 Drawing Sheets

LIGHTING DEVICE, LIGHTING ATTACHMENT DEVICE, AND METHOD FOR MANUFACTURING LIGHTING COVER

CROSS-REFERENCE TO RELATED APPLICATION

This application claims priority from Korean Patent Application No. 10-2020-0023981, filed on Feb. 27, 2020 in the Korean Intellectual Property Office, the disclosure of which is incorporated herein by reference in its entirety.

BACKGROUND

1. Technical Field

Apparatuses and methods consistent with exemplary embodiments relate to a lighting technology that uses a variable film to adjust a degree of optical scattering, and more particularly, to a lighting device, a lighting attachment device, and a method of manufacturing a lighting cover capable of providing light with various degrees of optical scattering to prevent drying in plants due to excessive luminous intensity levels and to allow uniform light irradiation for all plants.

2. Description of the Related Art

In general, in areas with a small land area and a large population, it may be difficult to apply large-scale farming machinery due to limited area of cultivated land. In these cases, food production may rely on chemical farming methods that use large amounts of fertilizers and pesticides, but there are limits to the level of productivity that such methods can achieve.

In addition, food production may be unstable in polar regions where sunlight is insufficient or in desert areas where water is insufficient. To solve this problem, controlled-environment agriculture has been developed to increase production by expanding production space and extending the production season, and to improve quality by properly controlling the environment within a limited space.

In order to improve productivity with controlled-environment agriculture, it is important to make the most of the genetic traits of crops by artificially controlling the environmental conditions within a limited facility space of a facility. For example, studies have shown that growth efficiency can be increased by artificially altering the illumination environment in a facility.

A plant performs photosynthesis when the chlorophyll pigments receive light, and photosynthesis begins as the chlorophyll molecules in the plant collect light energy and generate chemical energy that turns water and carbon dioxide into carbohydrates, which is a basic nutrient for sustaining life. A unique feature here is that the ability of chlorophyll to absorb light varies according to the wavelength of the light. That is, chlorophyll mainly absorbs light from the blue and red wavelength bands and mostly reflects light from the green and yellow wavelength bands, which are not of great importance in the photosynthesis process.

Plants do not use all of the white light coming from the sun, but selectively use only light in a specific wavelength band. Therefore, when cultivating crops with artificial light, irradiating white light would be to unnecessarily waste of energy, and it would be more efficient to irradiate blue or red light within the facility depending on the circumstances needed.

However, this does not mean that light of blue and red wavelengths provide the same effect to all plants, as the ratios between the types of light needed may vary depending on the type of crop, growth state, or stage of development. Thus, there is a need for technology that enables the irradiation of artificial light in facilities with the light source optimized according to circumstances.

Korean Registered Patent No. 10-1468141 (hereinafter referred to "reference 1"), which relates to a light-diffusion film composition and an agricultural light-diffusion film prepared from the same, provides a light-diffusion film which includes polyolefin resin, organic acrylic particles, and inorganic silicon particles. The light-diffusion film of reference 1 provides good optical transmissivity to minimize the amount of light that is lost by reflection and provides good optical diffusion to evenly scatter the transmitted light in many directions, so that each point within a greenhouse may be provided with light in a level of brightness suitable for crop growth. However, the light-diffusion film provided by reference 1 is fixed and cannot provide suitable degrees of optical scattering in a variable manner according to the growth phase of the crop.

Therefore, there is a demand for an optical film capable of providing various optical scattering degrees according to the growth state of plants in a narrow space, and a demand for a technology related to variable control of such optical film.

SUMMARY

Aspects of one or more exemplary embodiments provide a lighting device, a lighting attachment device, and a method for manufacturing a lighting cover capable of providing various degrees of optical scattering according to the growth state of plants and thereby provide even levels of luminous intensity suitable for the growth of the plants.

Aspects of one or more exemplary embodiments also provide a lighting device, a lighting attachment device, and a method for manufacturing a lighting cover having a film, through which light passes, partitioned into a plurality of scattering regions having respective scattering regions configured to provide different degrees of optical scattering by having at least one of the concentrations of the optical-scattering agent, the type of optical-scattering agent, the particle size of the optical-scattering agent, and the thickness of the optical-scattering agent layer configured differently.

Aspects of one or more exemplary embodiments also provide a lighting device, a lighting attachment device, and a method for manufacturing a lighting cover capable of increasing the utility of a lighting unit by incorporating a lighting cover including a cover film having different scattering regions of different degrees of optical scattering into the lighting unit as an integrated part or by allowing a detachable mounting of a supplementary lighting cover including a cover film having different scattering regions of different degrees of optical scattering onto the lighting unit.

According to an aspect of an exemplary embodiment, there is provided a lighting device including: a lighting unit having a lighting cover, the lighting cover having an adjustable degree of optical scattering; and a control unit configured to adjust the lighting cover to an appropriate degree of optical scattering according to the growth state of a cultivation subject.

The lighting cover can include a cover film which may have a plurality of scattering zones, each having a different degree of optical scattering, and a driving unit which may be configured to adjust the degree of optical scattering of an inputted light by moving the cover film.

The cover film can have at least one of the concentration of the optical-scattering agent, the type of optical-scattering agent, the particle size of the optical-scattering agent, and the layer thickness of the optical-scattering agent configured differently for each of the scattering zones.

A monitoring unit can be additionally included, which may be configured to determine the growth state of the cultivation subject, and the control unit can control the driving unit of the lighting cover based on a growth-state value provided by the monitoring unit.

According to an aspect of another exemplary embodiment, there is provided a lighting attachment device including: a supplementary lighting cover having an adjustable degree of optical scattering and configured to be detachably mounted to a lighting device; and a control unit configured to adjust the supplementary lighting cover to an appropriate degree of optical scattering according to the growth state of a cultivation subject.

The supplementary lighting cover can include a cover film which may have a plurality of scattering zones, each having a different degree of optical scattering, and a driving unit which may be configured to adjust the degree of optical scattering of an inputted light by moving the cover film.

The cover film can have at least one of the concentration of the optical-scattering agent, the type of optical-scattering agent, the particle size of the optical-scattering agent, and the layer thickness of the optical-scattering agent configured differently for each of the scattering zones.

A monitoring unit can be additionally included, which may be configured to determine the growth state of the cultivation subject, and the control unit can control the driving unit of the supplementary lighting cover based on a growth-state value provided by the monitoring unit.

According to an aspect of another exemplary embodiment, there is provided a method for manufacturing a lighting cover including: partitioning a lighting cover of a synthetic resin material into a plurality of scattering zones; and coating an optical-scattering agent on the lighting cover such that each of the plurality of scattering zones has a different degree of optical scattering.

The partitioning operation can include partitioning the plurality of scattering zones along a lengthwise direction of a film-type lighting cover.

The partitioning operation can include partitioning the plurality of scattering zones along a concentric direction of a disk-type lighting cover.

The coating operation can include coating the optical-scattering agent such that at least one of the concentration of the optical-scattering agent, the type of optical-scattering agent, the particle size of the optical-scattering agent, and the layer thickness of the optical-scattering agent is configured differently for each of the scattering zones.

A lighting device, a lighting attachment device, or a method for manufacturing a lighting cover according to an exemplary embodiment can provide the following advantages.

As the degree of optical scattering can be varied according to the growth state of the cultivation subject, it is possible to evenly provide light that is suitable for growth.

An exemplary embodiment can have the film, through which light passes, partitioned into a plurality of scattering zones, in which each of the zones can be made to have a different degree of optical scattering by having at least one of the concentration of the optical-scattering agent, the type of optical-scattering agent, the particle size of the optical-scattering agent, and the layer thickness of the optical-scattering agent configured differently for each of the scattering zones.

An exemplary embodiment can increase the utility of a lighting unit by incorporating a lighting cover, which includes a cover film having different scattering zones of different degrees of optical scattering, into the lighting unit as an integrated part or by allowing the detachable mounting of a supplementary lighting cover, which includes a cover film having different scattering zones of different degrees of optical scattering, onto the lighting unit.

It is understood that the advantages of one or more exemplary embodiments are not limited thereto, and other advantages would be apparent to the skilled person from descriptions below.

Additional aspects and advantages of the present disclosure will be set forth in part in the description which follows, and in part will be obvious from the description, or may be learned by practice of the disclosure.

BRIEF DESCRIPTION OF THE DRAWINGS

The above and other aspects and features will become more apparent from the following description of the exemplary embodiments with reference to the accompanying drawings, in which.

DETAILED DESCRIPTION

Figure 1:
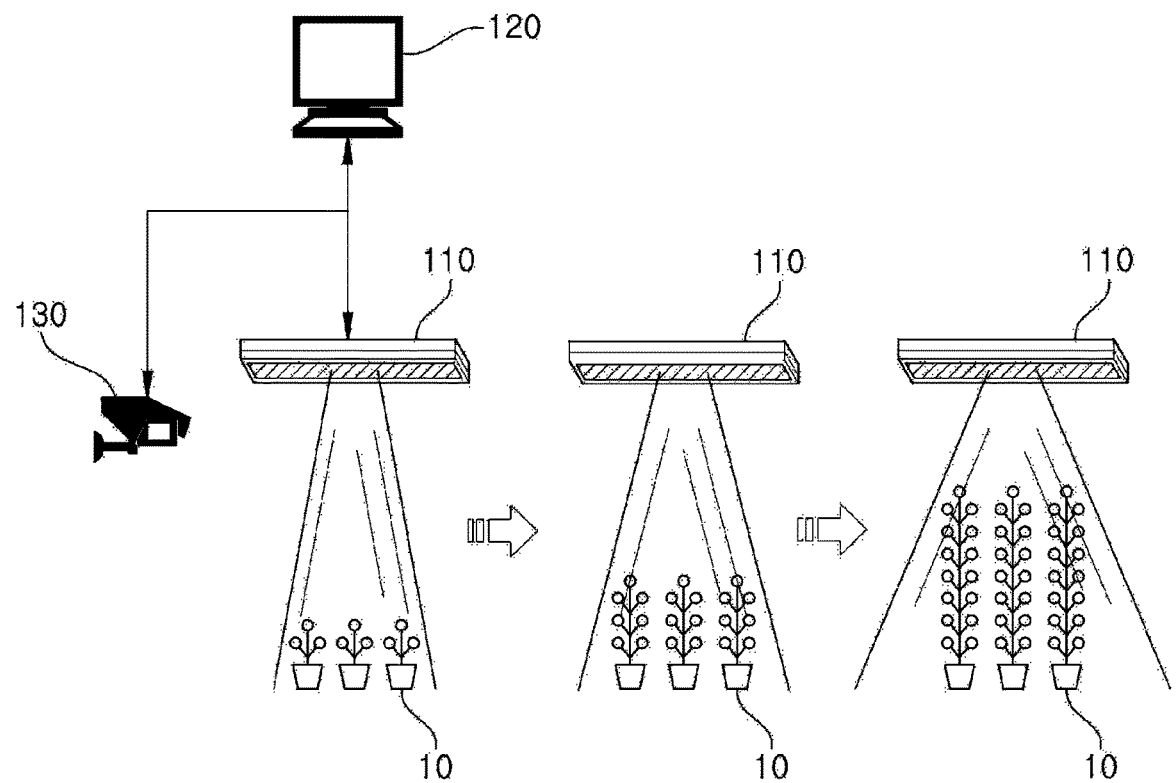
FIG. 1 is a conceptual diagram of a lighting device according to an exemplary embodiment.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein The terms used herein are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

While terms "first" and "second," etc., may be used to describe various components, the components must not be limited to the above terms. The above terms are used only to distinguish one component from another.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Certain embodiments will be described below in more detail with reference to the accompanying drawings. Those components that are the same or are in correspondence are rendered the same reference numeral, and redundant descriptions are omitted.

A lighting device, a lighting attachment device, and a method for manufacturing a lighting cover according to one or more exemplary embodiments are described below in detail with reference to the accompanying drawings.

As used herein, a "cultivation subject" refers to an organism that is artificially cultivated by a user and can include any of various plants, such as vegetables, fruit trees, mushrooms, flowers, etc., as well as microalgae, corals, etc. The present specification uses the term "plant", but this is for the sake of convenience only, and the cultivation subject is not limited thereto.

Figure 2:
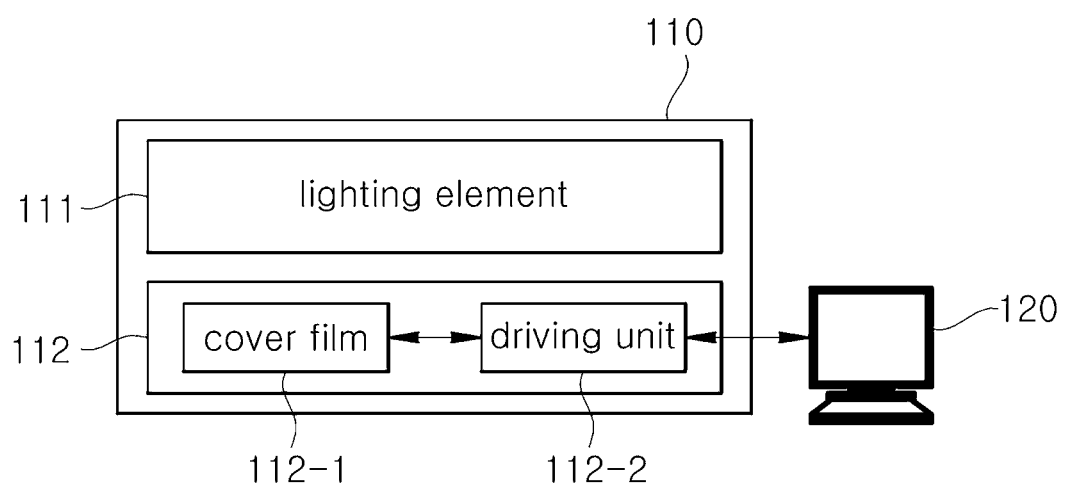
FIG. 2 is a diagram illustrating an example of a lighting unit in a lighting device according to an exemplary embodiment.

FIG. 1 is a conceptual diagram of a lighting device according to an exemplary embodiment, and FIG. 2 is a block diagram of the lighting device of FIG. 1.

Referring to FIGS. 1 and 2, a lighting device according to an exemplary embodiment can include lighting units 110, a control unit 120, and a monitoring unit 130.

the lighting unit 110 may include a lighting element 111 that generates artificial light and a lighting cover 112 that adjusts a degree of optical scattering of incident light irradiated from the lighting element 111. The lighting unit 110 can be matched with and provide artificial light to an individual plant 10 or a group of plants 10 having similar growth states.

The lighting element 111 may generate artificial light by using any one of an LED (light-emitting diode), a halogen lamp, a fluorescent lamp, an incandescent lamp, etc.

The lighting cover 112 may include a cover film 112-1 having a plurality of scattering zones, each having a different degree of optical scattering, and a driving unit 112-2 that moves the cover film 112-1 to adjust the degree of optical scattering of the incident light provided from the lighting element 111.

The cover film 112-1 can be arranged separately from the lighting element 111 and can be partitioned into multiple scattering zones with different degrees of optical scattering. For example, the cover film 112-1 can have an elongated shape along a lengthwise direction in a manner similar to a film roll for an analog camera or a circular shape in a manner similar to a color filter for color-variable lighting devices frequently used in concert halls. Thus, the cover film 112-1 can be rolled (in the case of a film shape) or rotated (in the case of a color filter shape) by the driving unit 112-2, as a result of which incident light may pass through a scattering zone specified by the driving unit 112-2 from among the plurality of scattering zones.

The cover film 112-1 can be slim and can be made from a transparent material. Specific examples may include nylons, PC (polycarbonates), CCP (color-coded polyethylene), modified polyphenylene ether, PET (polyethylene terephthalate), PEN (polyethylene naphthalate), PBT (polybutylene terephthalate), PAN (polyacrylonitrile), PTFE (polytetra fluoroethylene), ETFE (ethylene tetrafluoroethylene), PVF (polyvinyl fluoride), and PVDF (polyvinylidene Fluoride), and at least one of which may be used for the cover film 112-1. It is understood that any material other than the examples described-above can be utilized for the cover film 112-1 if the material is slim and provides a quality close to transparency.

The cover film 112-1 can be made such that the degrees of optical scattering are different for different scattering zones, which may be achieved by having at least one of the concentration of optical-scattering agent, the type of optical-scattering agent, the particle size of the optical-scattering agent, and the layer thickness of the optical-scattering agent configured differently for each of the scattering zones. An optical-scattering agent can be a powder of a particular particle size for scattering the incident light and can be coated over the scattering zones.

The concentration of the optical-scattering agent refers to how densely the optical-scattering agent is coated. Supposing an optical-scattering agent of the same type, same particle size, and same layer thickness is coated, a higher concentration would provide a higher degree of optical scattering.

For the optical-scattering agent, a polyacrylate-based polymer such as PMMA (polymethyl methacrylate), PS (polystyrene), etc., a silicone-based polymer such as PMSQ (polymethyl silsesquioxane), etc., or an inorganic dispersant such as $SiO_2$, $TiO_2$, $Al_2O_3$, etc., can be used. Also, the optical-scattering agent can contain wavelength conversion substances such as quantum dots, inorganic fluorescent substances, and perovskites mixed therein, and even if substances for other purposes are mixed or synthesized therein, a substance can be considered an "optical-scattering agent" in the context of the present disclosure if the substance is able to perform an optical scattering function even in a small degree.

Figure 3A:
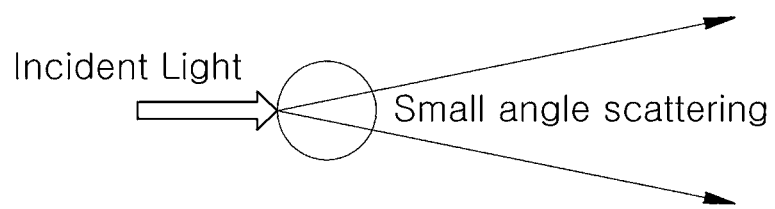
FIG. 3A and FIG. 3B are diagrams illustrating how the degrees of optical scattering may vary depending on the particle size of the optical-scattering agent.
Figure 3B:
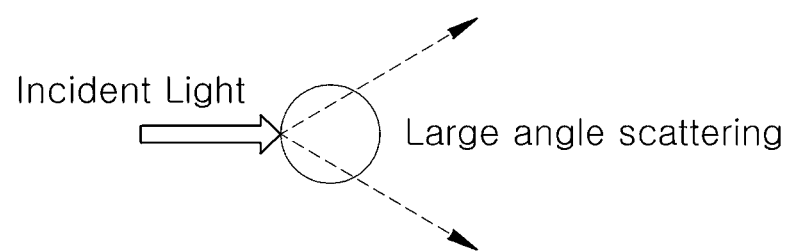

A smaller particle size for an optical-scattering agent can provide a broader range of scattering angle. As illustrated in FIG. 3A and FIG. 3B, for the same incident light, an optical-scattering agent having a smaller particle size provides a larger range of optical scattering compared to an optical-scattering agent having a larger particle size. Also, because the extent of scattering depends on the wavelength of the light and the particle size, it is possible to adjust the particle size of the optical-scattering agent according to the wavelength of the light to achieve the scattering effect desired by the user.

A thickness of the layer of optical-scattering agent relates to how thick the optical-scattering agent is coated. Supposing an optical-scattering agent of the same type, same particle size, and same concentration is coated, a thicker layer of optical-scattering agent would provide a higher degree of optical scattering.

Figure 4A:
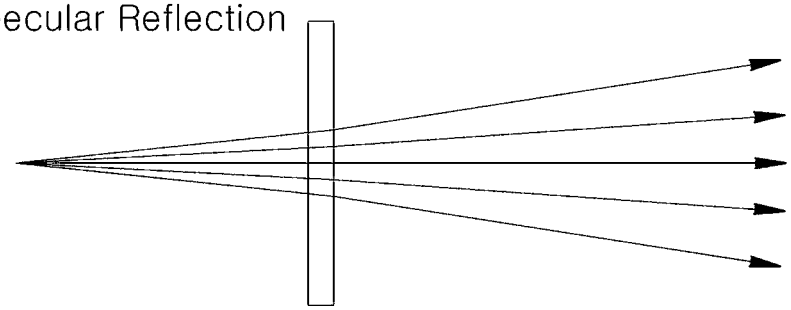
FIG. 4A and FIG. 4B are diagrams illustrating an optical dispersal effect associated with the state of a surface.
Figure 4B:
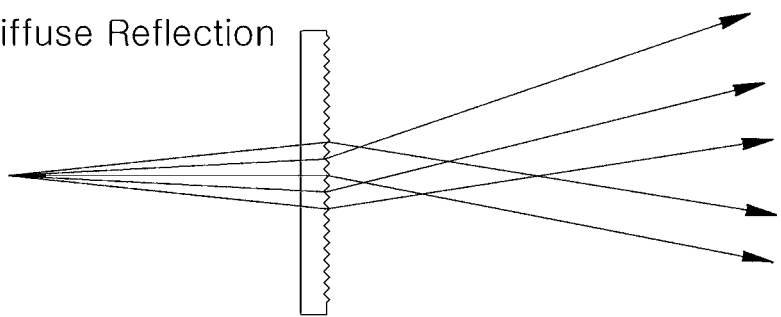

Referring to FIG. 4A and FIG. 4B, the degree of optical scattering can differ depending on a surface condition of the optical-scattering layer, i.e. the surface condition of the cover film 112-1. If the cover film 112-1 is smooth, specular reflection may occur, and if bumpy patterns are formed on the cover film 112-1, diffuse reflection may occur. Having diffuse reflection on the cover film 112-1 may provide a higher optical scattering effect than regular reflection.

In one exemplary embodiment, the cover film 112-1 can be shaped in a form similar to a film for an analog camera and can have the multiple scattering zones formed along the lengthwise direction with respect to the lighting cover 112. In another exemplary embodiment, the cover film 112-1 can be shaped in a form of a circular disk and can have the multiple scattering zones formed along a circumferential direction with respect to the lighting cover 112.

The driving unit 112-2 may move the cover film 112-1 to adjust the degree of optical scattering of the incident light transferred from the lighting element 111.

In one exemplary embodiment, the driving unit 112-2 can have the cover film 112-1 formed in a film type. In this case, two rollers may be included, and each of the two rollers can be positioned at either end of the cover film 112-1 to receive a rotational force from a motor. The driving unit 112-2 may rotate either end of the cover film 112-1 by a predetermined rotation angle and rotation direction by way of the two rollers driven by the rotational force of the motor, so that the incident light may be directed to one of the multiple scattering zones of the cover film 112-1.

In another exemplary embodiment, the driving unit 112-2 can have the cover film 112-1 formed in a disk type. In this case, a shaft may be included for rotating a central axis of the cover film 112-1, and the shaft can be positioned at the center of the cover film 112-1 to receive a rotational force from a motor. The driving unit 112-2 may rotate the center of the cover film 112-1 by a predetermined rotation angle and rotation direction by way of the shaft driven by the rotational force of the motor, so that the incident light may be directed to one of the multiple scattering zones of the cover film 112-1.

Although the descriptions only refer to examples of the driving unit 112-2 for cases in which the cover film 112-1 is formed in a film type or a circular disk type, it is understood that the disclosure is not limited thereto, and various forms can be employed depending on the shape of the cover film 112-1 as long as the driving unit 112-2 can move the cover film 112-1.

The control unit 120 may control an overall operation of the lighting unit 110.

The control unit 120 may control the lighting cover 112 to have a suitable degree of optical scattering according to the growth state of the plant 10. To this end, the control unit 120 may directly receive input of the growth state of the plant 10 from an operator taking care of the growth of the plant 10 or have a wired or wireless connection to the monitoring unit 130 to be provided with the growth state of the plant 10 from the monitoring unit 130 and may control the rotation angle and/or rotation direction of the driving unit 112-2 according to the inputted or provided growth state of the plant 10.

The control unit 120 can be arranged separately from the lighting unit 110 with a connection to the lighting unit 110 based on wired or wireless communication or can be embedded within the lighting unit 110 in the form of a controller module with an electrical connection to the lighting element 111 and/or the lighting cover 112.

The control unit 120, upon receiving the growth state of the plant 10 from the monitoring unit 130, can control the driving unit 112-2 of the lighting cover 112 based on the various sensing information regarding the growth state of the plant 10 provided by the monitoring unit 130.

For example, the control unit 120 can analyze an image of the plant 10 received from the monitoring unit 130 to compute a height value to which the plant 10 has grown, a width value to which the plant 10 has grown, the numbers of leaves/fruits/flowers on the plant 10, size values for the leaves/fruits/flowers of the plant 10, color information of the plant 10, etc., and can determine a growth state value for the plant 10 based on the computed information. The control unit 120 may decide on the suitable degree of optical scattering based on the growth state value of the plant 10, determine the scattering zone on the cover film 112-1 that provides such suitable degree of optical scattering, and control the driving unit 112-2 such that the light of the lighting element 111 is irradiated onto the scattering zone.

The control unit 120 can match the information regarding suitable degrees of optical scattering for growth states of the plant 10 with the scattering zones corresponding to the degrees of optical scattering and can store and maintain the matched information in a database. The control unit 120 can determine the rotation angle and/or rotation direction of the driving unit 112-2 based on the information stored in the database.

In one exemplary embodiment, the control unit 120 can identify a position of each of the multiple scattering zones on the lighting cover 112, determine the scattering zone corresponding to the degree of optical scattering suitable to the current growth of the plant 10, and control the rotation angle and/or rotation direction of the driving unit 112-2 based on the identified positions of the scattering zones such that the incident light is directed to the determined scattering zone. Here, the multiple scattering zones can include position identification codes to identify position.

The control unit 120 can provide a user interface screen to provide the operator with at least one of information on the operating status of the lighting unit 110, information on the operating status of the monitoring unit 130, and information on the growth state of the plant 10 or enable the operator to input or manipulate at least one of information on the operating status of the lighting unit 110, information on the operating status of the monitoring unit 130, and information on the growth state of the plant 10.

The growth state of a plant 10 can be expressed as a growth state value based on at least one of the grown height, the grown width, the size of a leaf, the size of a flower, the size of a fruit, the number of leaves, the number of flowers, the number of fruits, the growth speed, and the color of the plant 10.

The monitoring unit 130 may be a device for monitoring the growth state of the plant 10. The monitoring unit 130 can use a first camera installed at a side surface of an indoor space in which the lighting device is installed and/or a second camera installed at an upper surface of the indoor space. The first camera may obtain an image to extract the height to which the plant 10 has grown and the numbers of leaves/fruits/flowers of the plant 10, and the second camera may obtain an image to extract the width to which the plant 10 has grown, the sizes of the leaves/fruits/flowers of the plant 10, and the color information of the plant 10. The first camera and second camera are examples only, and any type of sensor capable of detecting the growth of a plant can correspond to the monitoring unit 130.

The monitoring unit 130 may be connected to the control unit 120 via wired or wireless communication to provide sensing information obtained by sensors, i.e. image data, to the control unit 120.

Figure 5:
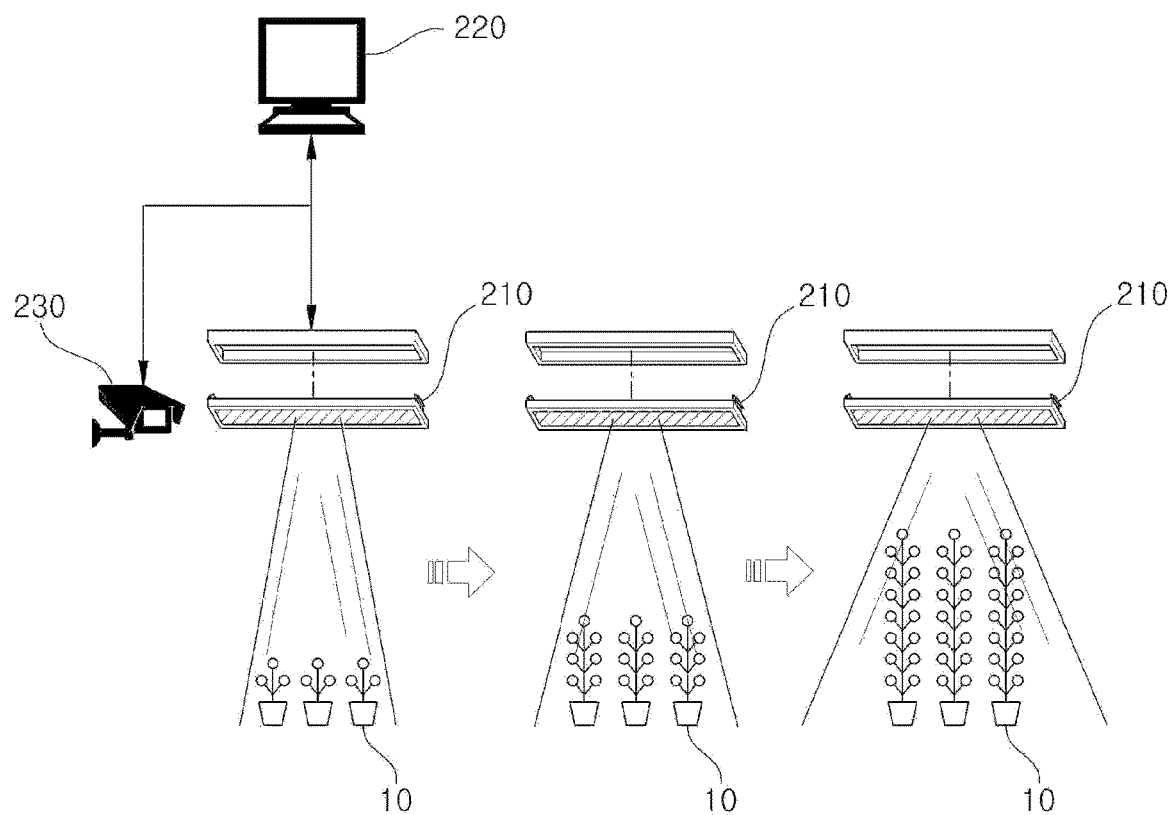
FIG. 5 is a conceptual diagram of a lighting attachment device according to an exemplary embodiment.
Figure 6:
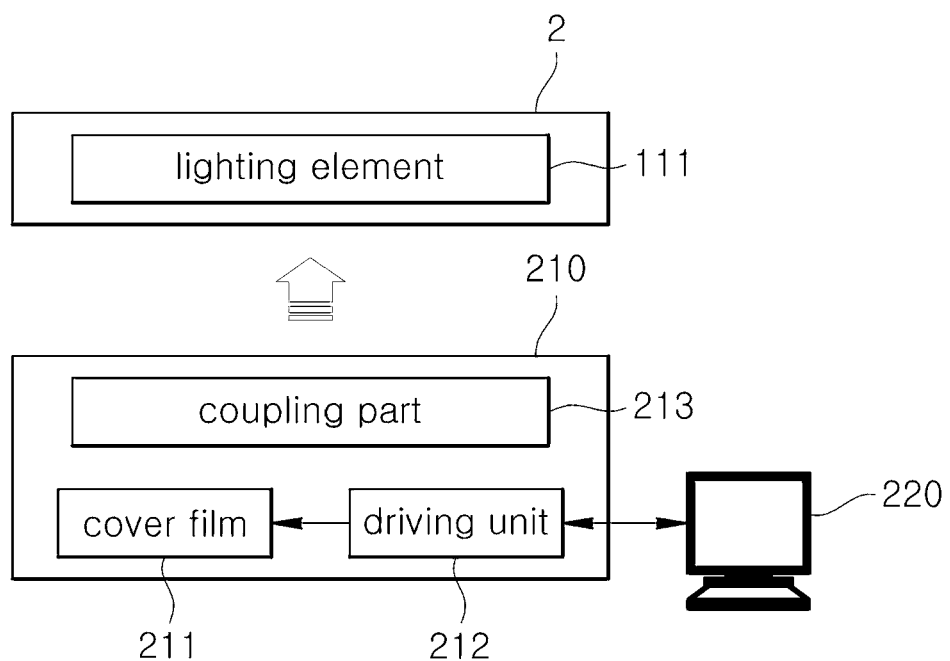
FIG. 6 is a diagram illustrating an example of a lighting unit in a lighting attachment device according to an exemplary embodiment.

FIG. 5 is a conceptual diagram of a lighting attachment device according to an exemplary embodiment, and FIG. 6 is a diagram illustrating an example of a lighting unit in a lighting attachment device according to an exemplary embodiment.

In the example of FIG. 5 and FIG. 6, a related art lighting device is already installed in a cultivation facility, and a lighting attachment device based on an exemplary embodiment is mounted additionally, without having the existing lighting device removed, to provide a function for varying the degree of optical scattering at a minimal cost.

As illustrated in FIG. 5 and FIG. 6, a lighting attachment device according to an exemplary embodiment can include a supplementary lighting cover 210, a control unit 220, and a monitoring unit 230. However, the lighting attachment device need not include a lighting unit that is equipped with a lighting element 111.

The supplementary lighting cover 210 may include a cover film 211, a driving unit 212, and a coupling part 213, and adjust the degree of optical scattering for the artificial light irradiated from the lighting element 111 of the lighting unit 2. The cover film 211 and the driving unit 212 may have the same functions and compositions as those of the cover film 112-1 and driving unit 112-2 illustrated in FIG. 2.

The supplementary lighting cover 210 may, by the coupling part 213, be easily attached to and detached from the lighting unit 2 already installed in the indoor space.

Figure 7:
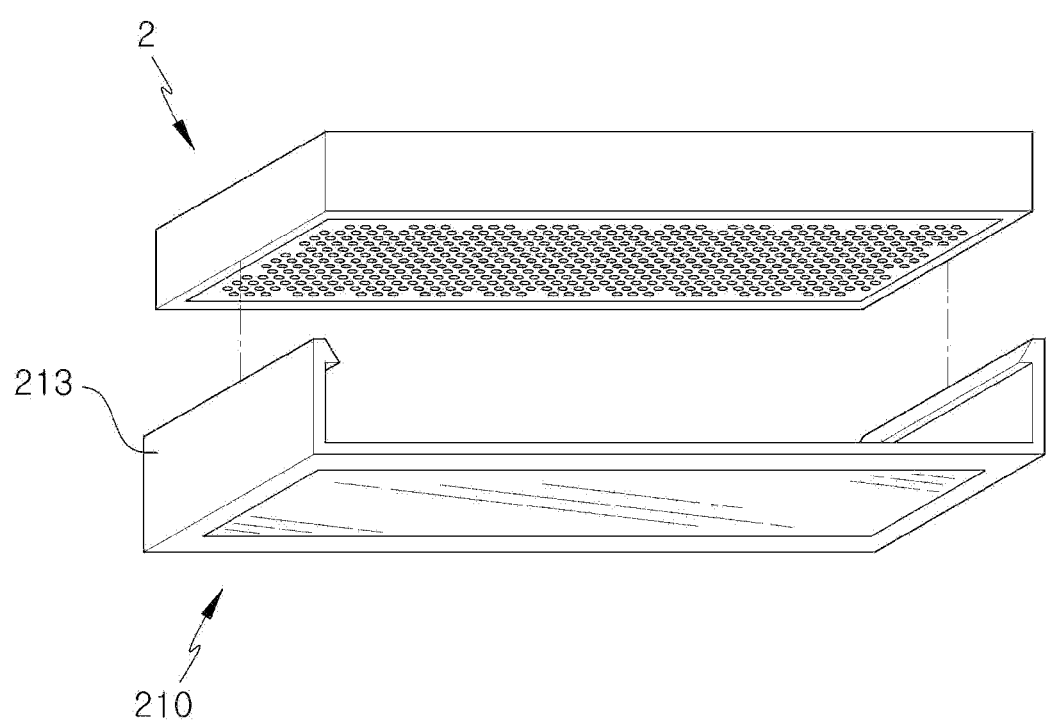
FIG. 7 is a perspective view illustrating an example of a supplementary lighting cover on which a coupling part is formed.

FIG. 7 is a perspective view illustrating an example of a supplementary lighting cover 210 on which a coupling part 213 is formed. To focus mainly on the coupling part 213, explicit depictions of the cover film 211 and driving unit 212 have been omitted.

The coupling part 213 can be implemented in various embodiments.

For instance, fixing elements for attaching to the corresponding two ends of the lighting unit 2 can be formed on both sides of the supplementary lighting cover 210, and a detent latch for fixing to the lighting unit 2 can be formed at the end of each fixing member. While FIG. 7 illustrates an example in which a fixing member is formed as a rectangular plate, it would be possible to form the fixing member as a multiple number of rod-shaped members having detent latches formed thereon or as a rectangular ring-shaped member with a hollow middle point.

In another example, the fixing members at both sides of the supplementary lighting cover 210 may not be formed as an integrated part of the supplementary lighting cover 210 but rather can be inserted or withdrawn along guide rails formed on an inside of the supplementary lighting cover 210 to be flexibly adjusted according to the width of the lighting unit 2.

In this case, the fixing member can be formed in the shape of the letter "L", and the lower end portion of the letter "L" may serve as a sliding bar that is inserted into the guide rail formed in the supplementary lighting cover 210. On one surface of the sliding bar, protruding stoppers can be formed in certain intervals, while one or more stopper indentations can be formed in the guide rail, so as to enable a stepwise adjustment of the sliding depth and to prevent unintentional detachments once the fixing member is attached to the lighting unit 2.

In another example, in a fixing member formed as an integrated part of the supplementary lighting cover 210 or an "L"-shaped fixing member configured to slide onto the supplementary lighting cover 210, at least one screw holes can be formed on the surface of the fixing member corresponding to the side of the lighting device, and fixing screws can be fastened and tightened through the one or more screw holes after the supplementary lighting cover 210 is coupled to the lighting device, so that the supplementary lighting cover 210 may be fixed to the lighting device in a stable manner.

In still another example, guide rails can be formed at the lower surface of the lighting unit 2 facing downward, on the edges of the frame excluding the area through which the light is outputted, in the lengthwise directions of the edges or their perpendicular directions. In this case, on the upper surface of the supplementary lighting cover 210 facing the lighting unit 2, on the edges of the frame other than the area through which the light is inputted, sliding bars can be formed protruding along the lengthwise directions or their perpendicular directions in correspondence to the guide rails. Thus, at places where only a single wavelength is needed, the lighting unit 2 can be supplied without the supplementary lighting cover 210 just as the lighting device only, whereas at places where precise wavelength control is needed, the lighting unit 2 and the supplementary lighting cover 210 can be supplied together, to be used in an integrated form after inserting the sliding bars onto the guide rails.

In yet another example, it is not necessary that the fixing member be provided in a form integrated with the supplementary lighting cover 210, and instead, at least one fastener made of plastic, fiber, rubber, etc., can be bound around the supplementary lighting cover 210 and the lighting unit 2 to couple them together.

The supplementary lighting cover 210 may include a cover film 211 that is equipped with a plurality of scattering zones, each having a different degree of optical scattering, and a driving unit 212 that moves the cover film 211 to adjust the degree of optical scattering for the incident light provided from the lighting element 111.

The cover film 211 of the supplementary lighting cover 210 may have the same function and composition as the cover film 112-1 of the lighting cover 112, and as such, redundant descriptions are omitted. Also, the driving unit 212 of the supplementary lighting cover 210 may have the same function and composition as the driving unit 112-2 of the lighting cover 112, and as such, redundant descriptions are omitted.

Likewise, the control unit 220 of the lighting attachment device may have the same function and composition as the control unit 120 of the lighting device, while the monitoring unit 230 of the lighting attachment device may have the same function and composition as the monitoring unit 130 of the lighting device, and as such, redundant descriptions are omitted.

Figure 8:
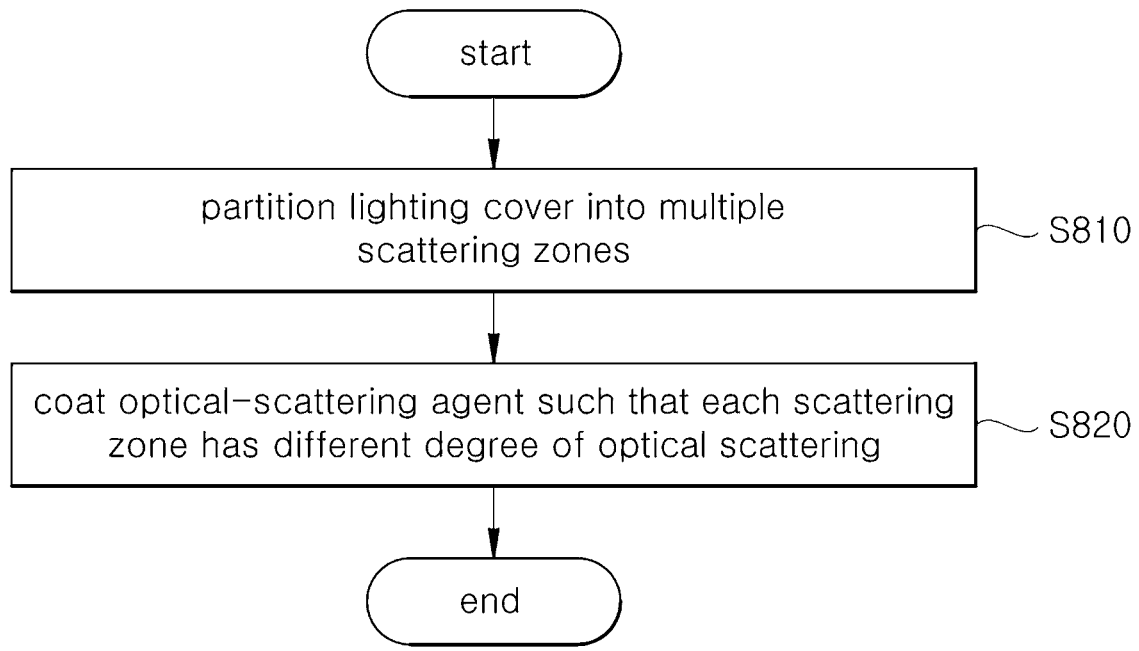
FIG. 8 is a flow diagram illustrating a process for manufacturing a lighting cover according to an exemplary embodiment.

FIG. 8 is a flow diagram illustrating a process for manufacturing a lighting cover according to an exemplary embodiment.

Referring to FIG. 8, a process for manufacturing a lighting cover according to an exemplary embodiment may include partitioning a lighting cover of a synthetic resin material into multiple scattering zones (operation S810) and coating an optical-scattering agent over the lighting cover such that each of the multiple scattering zones has a different degree of optical scattering (operation S820).

In one exemplary embodiment, the operation of partitioning the lighting cover into multiple scattering zones (operation S810) can entail partitioning a film-type lighting cover into multiple scattering zones along a lengthwise direction.

Figure 9:
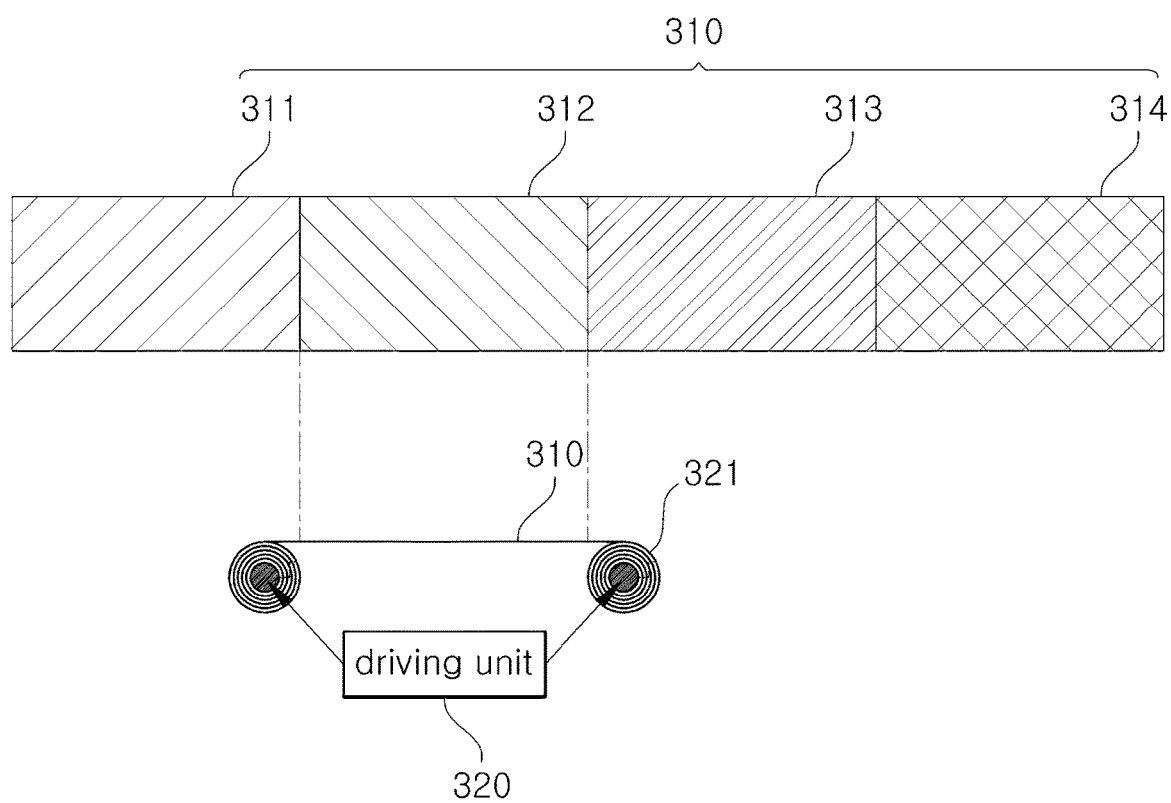
FIG. 9 is a diagram illustrating an example in which the lighting cover is manufactured in a film form according to an exemplary embodiment.

Referring to FIG. 9, the lighting cover can be formed in a film type, and the cover film 310 can also be formed in a film type, with scattering zones 311, 312, 313, and 314 partitioned along the lengthwise direction. The cover film 310 can be wound around two rollers 321 positioned at both ends, respectively, and by the roller 321 which is rotated by the driving unit 320 in a preconfigured rotation angle and rotation direction, the scattering zones 311, 312, 313, and 314 through which the incident light passes can be varied.

The first scattering zone 311, second scattering zone 312, third scattering zone 313, and fourth scattering zone 314 can have an optical-scattering agent coated such that at least one of the concentration of the optical-scattering agent, the type of optical-scattering agent, the particle size of the optical-scattering agent, and the layer thickness of the optical-scattering agent is different.

Figure 10:
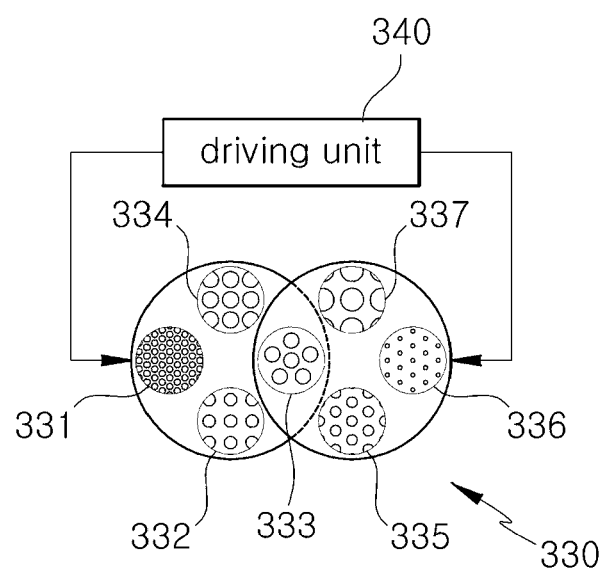
FIG. 10 is a diagram illustrating an example in which the lighting cover is manufactured in a disk form according to an exemplary embodiment.

In another exemplary embodiment, the operation of partitioning the lighting cover into multiple scattering zones (operation S810) can entail partitioning a disk-type lighting cover into multiple scattering zones along a concentric direction. Referring to FIG. 10, the lighting cover can be formed in a disk type, and the cover film 330 can also be formed in a disk type, with scattering zones 331, 332, 333, 334, 335, 336, and 337 partitioned along the concentric direction. The cover film 330 can have a shaft serving as a rotational axis at a center portion, and by the shaft which is rotated by the driving unit 340 in a preconfigured rotation angle and rotation direction, the scattering zones 331, 332, 333, 334, 335, 336, and 337 through which the incident light passes can be varied.

The first scattering zone 331, second scattering zone 332, third scattering zone 333, fourth scattering zone 334, fifth scattering zone 335, sixth scattering zone 336, and seventh scattering zone 337 can have an optical-scattering agent coated such that at least one of the concentration of the optical-scattering agent, the type of optical-scattering agent, the particle size of the optical-scattering agent, and the layer thickness of the optical-scattering agent is different.

While the exemplary embodiment of FIG. 10 is illustrated to include two disk-type cover films 330, it is possible to include only one cover film or three or more cover films as necessary.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A lighting device comprising:
a lighting unit having a light and a light cover, the light cover having an adjustable degree of optical scattering; and
a control unit configured to adjust the light cover to an appropriate degree of optical scattering according to a growing state of a cultivation subject,
wherein the light cover comprises a cover film and a driving unit, the cover film having a plurality of scattering zones, each of the scattering zones having a different degree of optical scattering, and the driving unit being configured to move the cover film so that the light illuminates one selected scattering zone and instead no longer illuminates the rest of scattering zones according to instructions of the control unit; wherein each of the scattering zones is formed to have a different constant degree of optical scattering.

2. The lighting device of claim 1, wherein the plurality of scattering zones are partitioned along a lengthwise direction of the light cover.

3. The lighting device of claim 1, wherein the cover film has at least one of a concentration of an optical-scattering agent, a type of the optical-scattering agent, a particle size of the optical-scattering agent, and a layer thickness of the optical-scattering agent configured differently for each of the scattering zones.

4. The lighting device of claim 1, further comprising a monitoring unit configured to determine the growing state of the cultivation subject,
wherein the control unit controls the driving unit of the light cover based on a growth-state value provided by the monitoring unit.

5. The lighting device according to claim 1,
wherein the plurality of scattering zones includes a first scattering zone having a first degree of optical scattering and a second scattering zone having a second degree of optical scattering, different from the first degree of optical scattering,
wherein the driving unit is configured to move the cover film to a predetermined direction so that the first scattering zone is moved away from the illumination of the light and the second scattering zone is moved in to the illumination of the light.

6. A lighting attachment device comprising:
a supplementary light cover having an adjustable degree of optical scattering and configured to be detachably mounted to a lighting device having a light; and
a control unit configured to adjust the supplementary light cover to an appropriate degree of optical scattering according to a growing state of a cultivation subject,
wherein the light cover comprises a cover film and a driving unit, the cover film having a plurality of scattering zones, each of the scattering zones having a different degree of optical scattering, and the driving unit being configured to move the cover film so that the light illuminates one selected scattering zone and instead no longer illuminates the rest of scattering zones according to instructions of the control unit; wherein each of the scattering zones is formed to have a different constant degree of optical scattering.

7. The lighting attachment device of claim 6, wherein the plurality of scattering zones are partitioned along a lengthwise direction of the supplementary light cover.

8. The lighting attachment device of claim 6, wherein the cover film has at least one of a concentration of an optical-scattering agent, a type of the optical-scattering agent, a particle size of the optical-scattering agent, and a layer thickness of the optical-scattering agent configured differently for each of the scattering zones.

9. The lighting attachment device of claim 6, further comprising a monitoring unit configured to determine the growing state of the cultivation subject,
wherein the control unit controls the driving unit of the supplementary light cover based on a growth-state value provided by the monitoring unit.

10. A method for manufacturing a light cover, the method comprising:
partitioning a light cover of a synthetic resin material into a plurality of scattering zones along a lengthwise direction of a film-type light cover, the light cover being configured to be movable so that a light illuminates one selected scattering zone and instead no longer illuminates the rest of scattering zones; and coating an optical-scattering agent on the light cover such that each of the plurality of scattering zones has a different degree of optical scattering; wherein each of the scattering zones is formed to have a different constant degree of optical scattering.

11. The method for manufacturing the light cover according to claim 10, wherein the coating comprises:

coating the optical-scattering agent such that at least one of a concentration of the optical-scattering agent, a type of the optical-scattering agent, a particle size of the optical-scattering agent, and a layer thickness of the optical-scattering agent is configured differently for each of the scattering zones.

* * * * *